(12) United States Patent
Abe et al.

(10) Patent No.: US 7,214,868 B2
(45) Date of Patent: May 8, 2007

(54) ACOUSTIC SIGNAL PROCESSING APPARATUS AND METHOD, SIGNAL RECORDING APPARATUS AND METHOD AND PROGRAM

(75) Inventors: Mototsugu Abe, Tokyo (JP); Akihiro Mukai, Chiba (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 10/730,550

(22) Filed: Dec. 8, 2003

(65) Prior Publication Data

US 2004/0200337 A1 Oct. 14, 2004

(30) Foreign Application Priority Data

Dec. 12, 2002 (JP) .......................... P2002-361302

(51) Int. Cl.
*G10H 1/00* (2006.01)
(52) U.S. Cl. .......................... 84/600; 84/601; 381/56; 324/76.15
(58) Field of Classification Search .......... 84/600–602; 381/56; 324/76.15
See application file for complete search history.

(56) References Cited

U.S. PATENT DOCUMENTS

| | | | | |
|---|---|---|---|---|
| 5,533,136 | A | * | 7/1996 | Smith .......................... 381/107 |
| 5,727,121 | A | * | 3/1998 | Chiba et al. .................. 704/214 |
| 2003/0125887 | A1 | * | 7/2003 | Ogawa et al. ................. 702/66 |
| 2004/0165730 | A1 | * | 8/2004 | Crockett ....................... 381/56 |
| 2006/0065102 | A1 | * | 3/2006 | Xu .............................. 84/600 |

FOREIGN PATENT DOCUMENTS

| | | |
|---|---|---|
| JP | 03-080782 | 4/1991 |
| JP | 07-105235 | 4/1995 |
| JP | 09-284704 | 10/1997 |
| JP | 09-284706 | 10/1997 |
| JP | 11-055613 | 2/1999 |
| JP | 11-238701 | 8/1999 |
| JP | 2001-143451 | 5/2001 |
| JP | 2001-147697 | 5/2001 |

* cited by examiner

*Primary Examiner*—Lincoln Donovan
*Assistant Examiner*—David S. Warren
(74) *Attorney, Agent, or Firm*—Sonnenschein Nath & Rosenthal LLP (57) ABSTRACT

A highlight portion is detected to a high accuracy from acoustic signals in say an event, and an index is added to the highlight portion. In an acoustic signal processing apparatus 10, a candidate domain extraction unit 13 retains a domain, a length of which with short-term amplitudes as calculated by an amplitude calculating unit 11 not being less than an amplitude threshold value is not less than a time threshold value, as a candidate domain. A feature extraction unit 14 extracts sound quality featuring quantities, relevant to the sound quality, from the acoustic signals, to quantify the sound quality peculiar to a climax. A candidate domain evaluating unit 15 calculates a score value, indicating the degree of the climax, using featuring quantities relevant to the amplitude or the sound quality for each candidate domain, in order to detect a true highlight domain, based on the so calculated score value. An index generating unit 16 generates and outputs an index including the start and end positions and the score values of the highlight domain.

19 Claims, 8 Drawing Sheets

ACOUSTIC SIGNAL PROCESSING APPARATUS AND METHOD, SIGNAL RECORDING APPARATUS AND METHOD AND PROGRAM

RELATED APPLICATION DATA

The present application claims priority to Japanese Application(s) No(s). P2002-36 1302 filed Dec. 12, 2003, which application(s) is/are incorporated herein by reference to the extent permitted by law.

BACKGROUND OF THE INVENTION

1. Field of the Invention

This invention relates to an apparatus and a method for processing acoustic signals, in which an index to featuring portions in the acoustic signals in e.g. an event is generated, and an apparatus and a method for recording signals, in which the index is imparted to the image signals and/or acoustic signals at the time of recording to enable skip reproduction or summary reproduction. This invention also relates to a program for having a computer execute the acoustic signal processing or recording.

2. Description of Related Art

In broadcast signals, or in image/acoustic signals, recorded therefrom, it is useful to detect crucial scenes automatically to impart an index or to formulate a summary image, in order to enable the contents thereof to be comprehended easily, or in order to retrieve the necessary signal portions expeditiously. Thus, it may be conjectured that, in an image of e.g. a sports event, preparation of a digest of the image or retrieval of a specified scene for secondary use may be facilitated by automatically generating an index to a climax portion and by imparting the index to the image/acoustic signals, such as by multiplexing.

For this reason, there is proposed in the cited reference 1 (Japanese Laying-Open Patent Publication 2001-143451) a technique in which a climax portion of an event, such as a sports event, is automatically detected and imparted as an index, based on the combination of relative values of the power level of the frequency spectrum and that of a specified frequency component. This technique, detecting the sound emitted by the spectators at the climax of the event, can be universally applied to a large variety of the events, and may be used for detecting the signal portions corresponding to crucial points throughout the process of the event.

However, the technique disclosed in the above-mentioned Patent Publication suffers from the problem that, since the factors relating to the sound quality, such as the shape of the spectrum, are not evaluated, the detection precision is basically low, while the technique cannot be applied to such a case where an extraneous sound co-exists in the sound of the specified frequency.

Consequently, the technique can be applied only to acoustic signals, recorded on the event site by professional engineers of e.g. a broadcasting station, and in which there are not mixed other extraneous signals, however, the technique cannot be applied to acoustic signals mixed with an inserted speech, such as announcer's speech, commentator's speech or the commercial message, as exemplified by broadcast signals. Additionally, the technique can scarcely be applied to a case where an armature, such as one of the spectators, records the scene, because the ambient sound, such as speech or conversation, is superposed on the acoustic signals being recorded.

SUMMARY OF THE INVENTION

In view of the above depicted status of the art, it is an object of the present invention to provide an apparatus and a method for processing acoustic signals, in which the highlight portion in the acoustic signals for an event may be accurately detected and an index may be generated for indexing the highlight portion, and an apparatus and a method for recording image signals/acoustic signals in which an index may be imparted for indexing the highlight portion at the time of recording the image signals and/or acoustic signals to enable skip reproduction or summary reproduction. It is another object of the present invention to provide a program for allowing a computer to execute the aforementioned processing or recording of the acoustic signals.

For accomplishing the above objects, the present invention provides an apparatus and a method for processing acoustic signals, in which, in detecting a featuring portion in the acoustic signals, produced in the course of the event, short-term amplitudes are calculated, every preset time domain of the acoustic signals, and a candidate domain for the featuring portion is extracted on the basis of the short-term amplitudes. On the other hand, the sound quality featuring quantities, quantifying the sound quality, are extracted, every preset time domain of the acoustic signals, and evaluation is made on the basis of the short-term amplitudes and the sound quality featuring quantities as to whether or not the candidate domain represents the featuring portion.

In the apparatus and the method for processing the acoustic signals, it is possible to generate the index information including at least the start position and the end position of the featuring portion.

In the apparatus and the method for processing the acoustic signals, a candidate domain of the featuring portion is extracted, on the basis of the short-term amplitudes of the acoustic signal, and evaluation is made as to whether or not the candidate domain is the featuring portion, on the basis of the short-term amplitudes and the sound quality featuring quantities.

For accomplishing the above objects, the present invention also provides an apparatus and a method for recording acoustic signals in which short-term amplitudes are calculated, every preset time domain of the acoustic signals, generated in the course of e.g. an event, and a candidate domain for the crucial portions of the acoustic signals are extracted, on the basis of the short-term amplitudes. The sound quality featuring quantities, quantifying the sound quality, are also extracted, every preset time domain of the acoustic signals. The degree of crucialness of the candidate domain is calculated, on the basis of the short-term amplitudes and the sound quality featuring quantities, and evaluation is made as to whether or not the candidate domain is the crucial portion, on the basis of the degree of crucialness. The index information, at least including the start and end positions and the degree of crucialness of the candidate domain, evaluated to be the aforementioned crucial portion, is generated and recorded on the recording means along with the index information.

With the recording apparatus and method for the acoustic signals, a candidate domain of the crucial portion is extracted, based on the short-term amplitudes of the acoustic signals, and evaluation is then made as to whether or not the candidate domain is the crucial portion, based on the short-term amplitudes and the sound quality featuring quantities. If the candidate domain is the crucial portion, the index information including at least the start and end positions and the degree of crucialness of the candidate domain in question is recorded on recording means along with the acoustic signals.

The program according to the present invention is such a one which allows a computer to execute the aforementioned acoustic signal processing or recording, while the recording medium according to the present invention is a computer-readable and has recorded thereon the program of the present invention.

With the apparatus and the method for processing the acoustic signals, according to the present invention, short-term amplitudes are calculated, every preset time length of the acoustic signals, in detecting the featuring portion in the acoustic signals, generated e.g. in the course of an event, and a candidate domain for the featuring portion is extracted on the basis of the short-term amplitudes. On the other hand, the sound quality featuring quantities, quantifying the sound quality, are extracted every preset time duration of the acoustic signals and, based on the short-term amplitudes and the sound quality featuring quantities, it is determined whether or not the candidate domain is the featuring portion.

With the apparatus and method for processing the acoustic signals, according to the present invention, the index information, at least including the start position and the end position of the featuring portion, may be generated.

With the apparatus and method for processing the acoustic signals, according to the present invention, the highlight portion in e.g. an event may be detected to a high accuracy by extracting a candidate domain of the featuring portion, based on the short-term amplitudes of the acoustic signals, and by evaluating whether or not the candidate domain is the featuring portion, based on the short-term amplitudes and the sound quality featuring quantities.

With the signal recording apparatus and method, according to the present invention, the short-term amplitudes are calculated, every preset time length of the acoustic signals, generated in the course of an event, and a candidate domain for the crucial portion of the acoustic signals is extracted, on the basis of the short-term amplitudes. On the other hand, the sound quality featuring quantities, quantifying the sound quality, are extracted every preset time length of the acoustic signals. Based on the short-term amplitudes and the sound quality featuring quantities, the crucialness of the candidate domain is calculated, and an evaluation is then made, based on the so calculated crucialness, as to whether or not the candidate domain is the aforementioned crucial portion. The index information, at least including the start and end positions and the degree of crucialness of the candidate domain, evaluated to be the crucial portion, is generated and recorded on recording means along with the acoustic signals.

With the signal recording apparatus and method, a candidate domain for a crucial portion is extracted, based on the short-term amplitudes of the acoustic signals, and the evaluation is then made as to whether or not the candidate domain is the crucial portion, based on the short-term amplitudes of the acoustic signals and the sound quality featuring quantities. If the candidate domain is the crucial portion, the index information, at least including the start and end positions and the degree of crucialness of the candidate domain, is recorded, along with the acoustic signals, on the recording means. Thus, it becomes possible to skip-reproduce only the crucial portions or to reproduce the summary image of only the crucial portion.

The program according to the present invention is such a one which allows the computer to execute the aforementioned processing or recording of the acoustic signals. The recording medium according to the present invention is computer-readable and has recorded thereon the program according to the present invention.

With the program and the recording medium, the aforementioned processing and recording of the acoustic signals may be implemented by the software.

BRIEF DESCRIPTION OF THE DRAWINGS

FIG. 1 shows an instance of acoustic signals in an event, where

FIG. 3 shows an instance of processing in a candidate domain extracting unit and a feature extracting unit in the acoustic signal processing apparatus, where

DESCRIPTION OF THE PREFERRED EMBODIMENTS

Referring to the drawings, certain preferred embodiments of the present invention will be explained in detail.

In general, in an event where a large number of spectators gather together, for example, sports event, peculiar acoustic effects, referred to below as 'climax' or 'highlight', due to the large number of the spectators simultaneously emitting the sound of hurrah, hand clapping or the effect sound in a scene of interest.

Figure 1A:
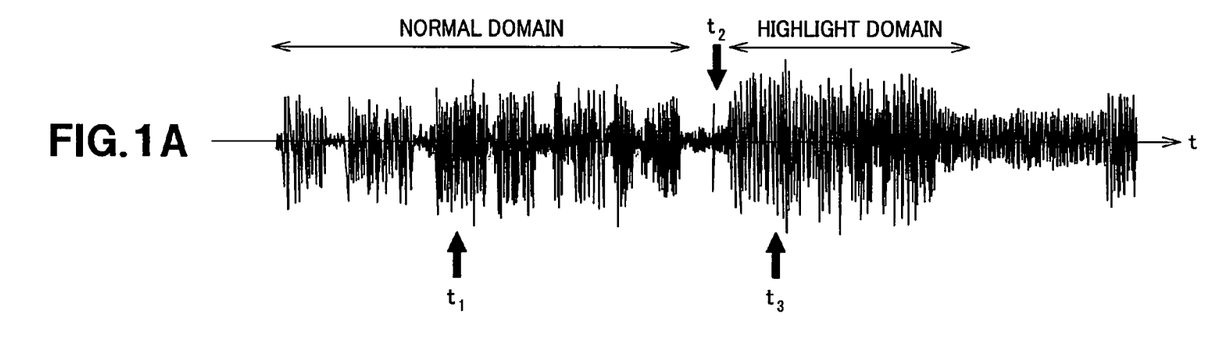
FIG. 1A depicts acoustic signals in baseball broadcast, and where

As an example, acoustic signals in a baseball broadcast are shown in FIG. 1A. In a former half normal period, the expository speech by an announcer is predominant, while the small sound emitted by the spectators is superimposed as its background. If a batter has batted a hit at time $t_2$, the climax sound emitted by the spectators becomes predominant at the latter half highlight period. The short-term spectrum of the acoustic signals during the normal time (time $t_1$) and that during the highlight time (time $t_3$) are shown in FIG. 1B and FIG. 1C, respectively.

Figure 1B:
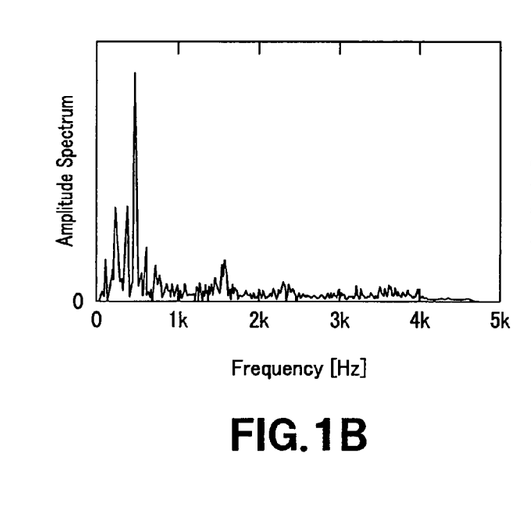
FIG. 1B and FIG. 1C depict short-time spectra of acoustic signals during normal time and during the climax time.
Figure 1C:
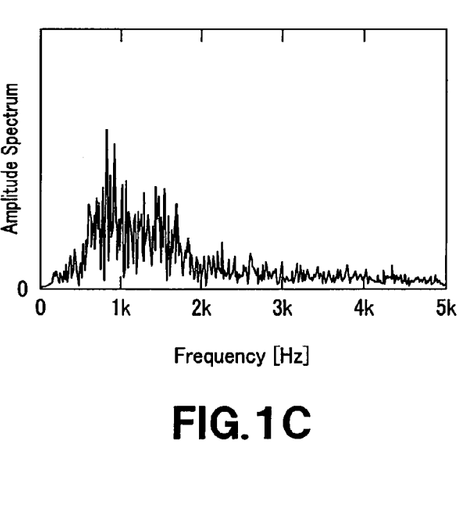

As may be seen from FIGS. 1A to 1C, there is noticed a difference in the amplitude structure or in the frequency structure between the highlight period and the normal period. For example, during the domain where the spectators are at a climax of sensation, the time with large sound amplitudes lasts longer than during the normal domain, while the short-term spectrum of the acoustic signals exhibits a pattern different from that exhibited during the normal domain. On the other hand, larger sound amplitudes occur during the normal period as well. Thus, especially with broadcast signals, it may be confirmed that the relative levels of the sound amplitude are insufficient as an index in checking whether or not a given domain is the highlight domain.

In the first embodiment of the acoustic signal processing apparatus, this difference in the sound amplitude or frequency structure of the acoustic signals is exploited to detect the highlight part of an event, where many spectators gather together, such as a sports event, to a high accuracy as being a crucial scene. Specifically, the domains where the time with larger sound amplitude lasts for longer than a predetermined time are retained to be candidates for highlight domains, and a score indicating the degree of the sensation of the spectators during the time of climax is calculated, for each candidate domain, using feature quantities pertaining to the sound amplitude or the sound quality. Based on these scores, the true highlight domains are detected.

Figure 2:
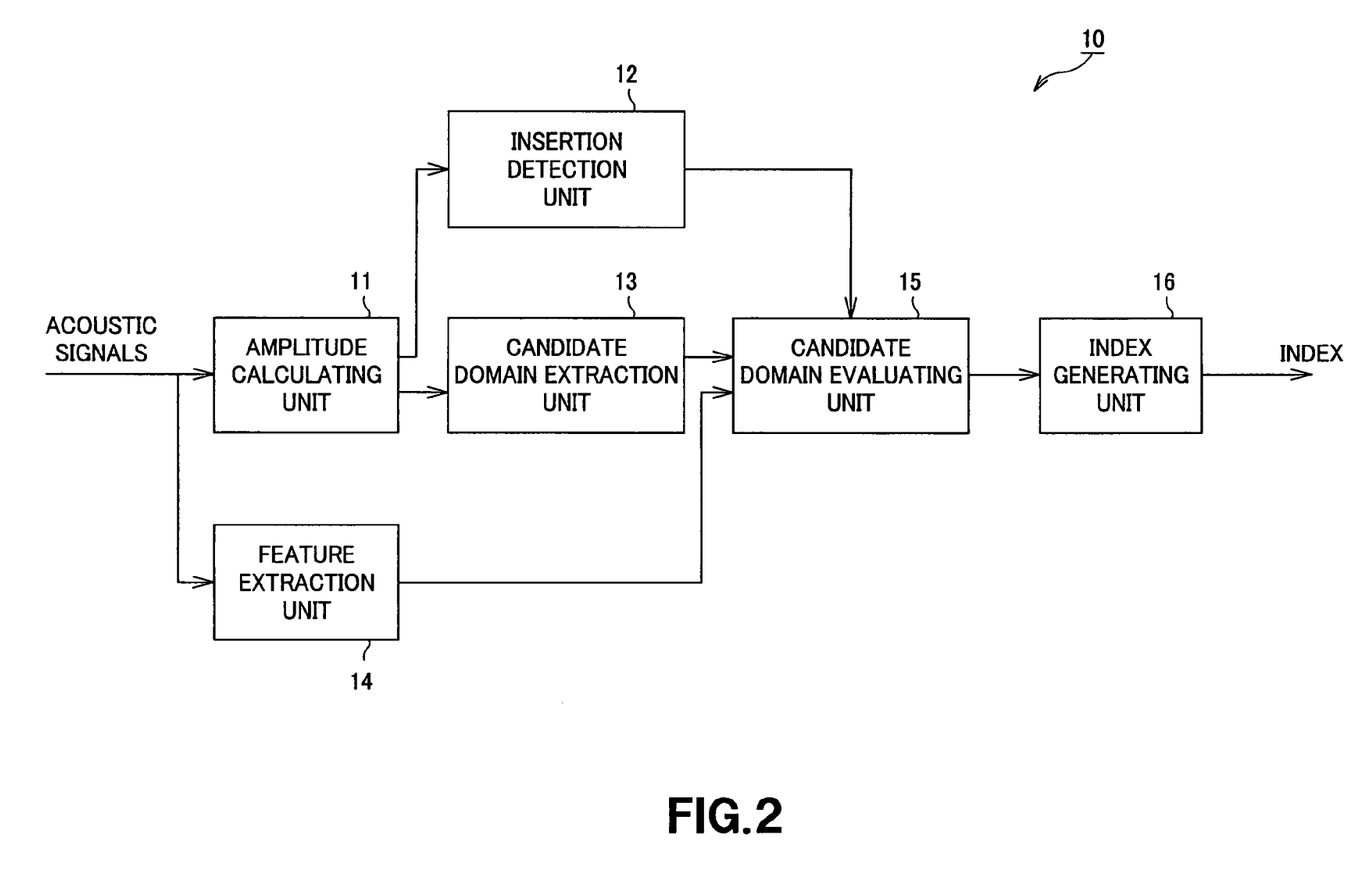
FIG. 2 shows a schematic structure of an acoustic signal processing apparatus in a first embodiment of the present invention.

The schematic structure of this acoustic signal processing apparatus is shown in FIG. 2, from which it is seen that the acoustic signal processing apparatus 10 is made up by an amplitude calculating unit 11, an insertion detection unit 12, a candidate domain extraction unit 13, a feature extraction unit 14, a candidate domain evaluating unit 15 and an index generating unit 16.

The amplitude calculating unit 11 calculates a mean square value or a mean absolute value of an input acoustic signal, every preset time period, to calculate short-term amplitudes A(t). Meanwhile, a band-pass filter may be provided ahead of the amplitude calculating unit 11 to remove unneeded frequency components at the outset to winepress the frequency to a necessary sufficient band to detect the amplitude of say the shoutings before proceeding to the calculation of the short-term amplitudes A(t). The amplitude calculating unit 11 sends the calculated short-term amplitudes A(t) to the insertion detection unit 12 and to the candidate domain extraction unit 13.

In case the input acoustic signals are broadcast signals, the insertion detection unit 12 detects the domains where there is inserted the information other than the main broadcast signals, such as replay scenes or commercial messages, sometimes abbreviated below to 'commercial'. It should be noted that the inserted scenes last for one minute or so, at the longest, and are featured by an extremely small value of the sound volume before and after the insertion. On the, other hand, there is always superposed the sound emanating from the spectators on the main acoustic signals, and hence it is only on extremely rare occasions that the sound volume of the main broadcast signals is reduced to a drastically small value. Thus, when small sound volume domains in which the short-term amplitudes A(t) supplied from the amplitude calculating unit 11 becomes smaller than a preset threshold value should occur a plural number of times within a preset time period, the insertion detection unit 12 detects the domains, demarcated by these small sound volume domains, as being the insertion domains.

In case the insertion detection unit 12 is able to detect not only the acoustic signals but also video signals, the technique disclosed in Japanese Laying-Open Patent Publication 2002-16873, previously proposed by the present inventors, may be used in order to permit more accurate detection of the 'commercial' of the commercial broadcast. This technique may be summarized as follows:

That is, almost all 'commercials', excepting only special cases, are produced with the duration of 15, 30 or 60 seconds, while the sound volume is necessarily lowered, while the video signals are changed over, before and after each commercial. Thus, these states are used as 'essential condition' for detection. In addition, the feature that a certain tendency is exhibited as a result of program production under the constraint conditions that the 'commercial' is produced in accordance with a preset standard, that the advertisement effects must be displayed in a short time, and that the 'commercial' produced is affected by the program structure, is to be an 'auxiliary condition' for detection. Moreover, the condition that, in case there exist plural domains satisfying the auxiliary condition in an overlapping relation to one another, at least one of these domains cannot be a correct 'commercial' domain, is to be the 'logical condition' for detection. By deterministically extracting the candidate for the 'commercial' based on the essential condition, selecting the candidate by statistic evaluation as to the 'commercial-like character' based on the 'auxiliary condition' and by eliminating the overlap states of the candidates by the 'logical condition', the 'commercial' can be detected to a high accuracy.

The insertion detection unit 12 sends the information, relevant to the insertion domain, detected as described above, to the candidate domain evaluating unit 15. It should be noted that, if the input acoustic signals are not broadcast signals, the insertion detection unit 12 may be dispensed with.

The candidate domain extraction unit 13 extracts candidates for the highlight domain, using the short-term amplitudes A(t) supplied from the amplitude calculating unit 11. During the highlight period, the domain with a larger sound volume on the average lasts longer, as discussed above. Thus, the candidate domain extraction unit 13 sets an amplitude threshold value $A_{thsd}$ and a time threshold value $T_{thsd}$ at the, outset and, if the duration T of the domain where $A(t) \geq A_{thsd}$ is such that $T \geq T_{thsd}$, the domain is retained to be a candidate for the highlight domain, and the beginning and end positions of the domain thereof are extracted. Meanwhile, a predetermined value may be set as the threshold value $A_{thsd}$, or the threshold value $A_{thsd}$ may be set on the basis of the mean value and the variance of the amplitudes of the acoustic signals of interest. In the former case, the threshold value may be processed in real-time in meeting with the broadcast and, in the latter case, a threshold value normalized as to the difference in the sound volume from stadium to stadium, from broadcasting station to broadcasting station, from mixing to mixing or from event to event, may be set.

Figure 3A:
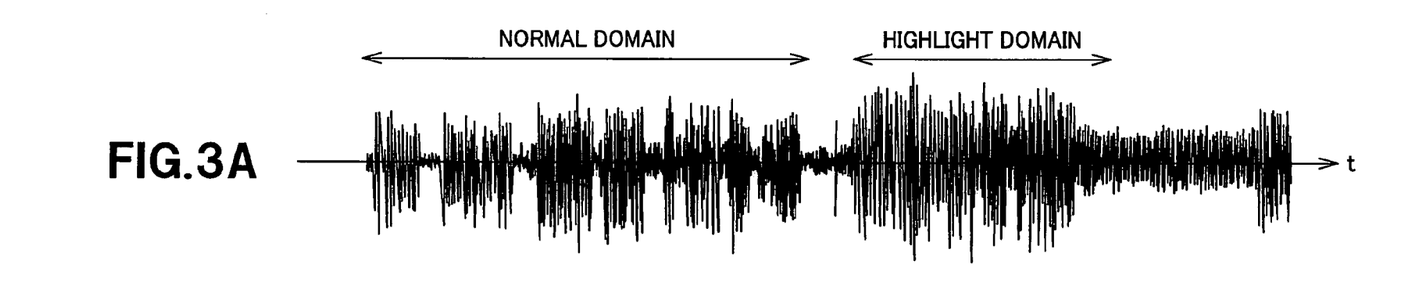
FIG. 3A shows an instance of acoustic signals in an event.
Figures 3B, 3C:
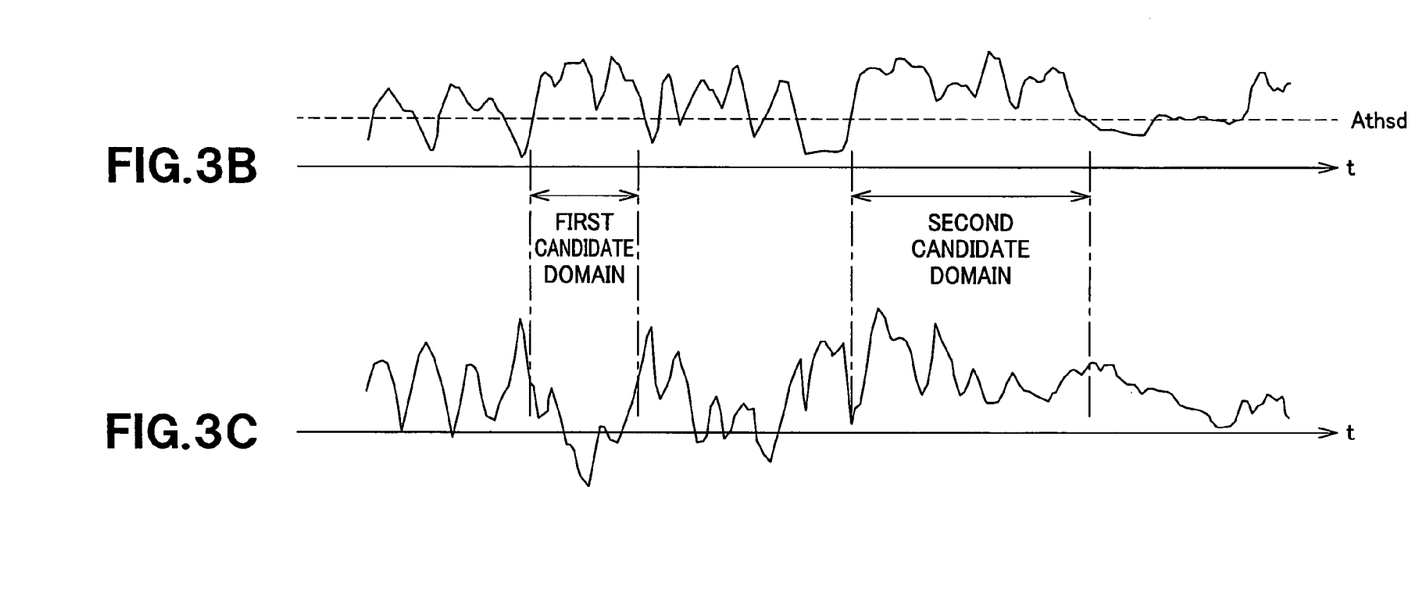
FIG. 3B shows a candidate domain as detected in the candidate domain extracting unit.
FIG. 3C shows sound quality featuring quantities as calculated in the feature extracting unit.

FIG. 3B shows an instance where two candidate domains have been extracted from the acoustic signals shown in FIG. 3A. It is noted that the acoustic signals are the same as those of FIG. 1A. As shown in FIG. 3B, the first candidate domain belongs to the normal domain, while the second candidate domain belongs to the highlight domain.

Figure 4:
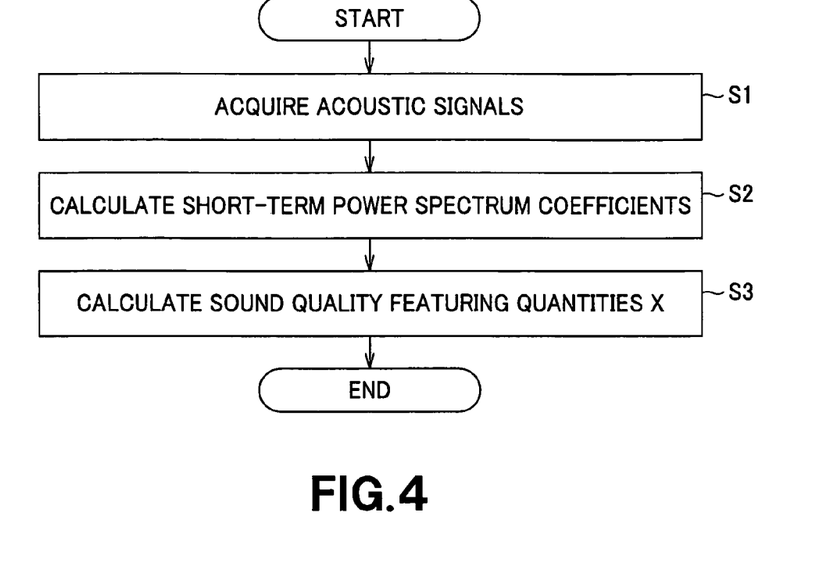
FIG. 4 is a flowchart for illustrating the operation in the feature extracting unit of the acoustic signal processing apparatus.

The feature extraction unit 14 extracts sound quality featuring quantities X, relevant to the sound quality, from the input acoustic signal, and quantifies the sound quality peculiar to the climax time. Specifically, as shown in the flowchart of FIG. 4, the acoustic signals of the predetermined time domain are acquired at first in a step S1 at the outset. The so acquired acoustic signals of the time domain are transformed in a step S2 into power spectral coefficients.

$S_0, \ldots, S_{M-1}$, using short-term Fourier transform or the LPC (linear predictive coding) method. It is noted that M denotes the number of orders of the spectrum.

In the next step S3, the loaded sum of the spectral coefficients $S_0, \ldots, S_{M-1}$ is calculated in accordance with the following equation(1):

$$X = \sum_{m=0}^{M-1} W_m S_m + \theta \quad (1)$$

to obtain the sound quality featuring quantities X.

In the above equation (1), $W_m$ denotes the load coefficient and $\theta$ denotes a predetermined bias value. A large variety of statistic verifying methods may be exploited in determining the load coefficient $W_m$ and the bias value $\theta$. For example, the degree of each of a large number of scenes is subjectively analyzed at the outset, and learning samples each consisting of a set of a spectral coefficient and a desirable featuring quantity (such as 0.0 to 1.0) are provided in order to find a linearly approximated load by multiple regression analysis and in order to determine the load coefficient $W_m$ and the bias value $\theta$. The neural network technique, such as perceptron, or the verifying methods, such as Baize discrimination method or the vector quantization, may be used.

In the feature extraction unit 14, cepstrum coefficients, as inverse Fourier transform of the logarithmic cepstrum coefficients, or the Karhunen-Loeve (KL) transform, as transform by eigenvector of the spectral coefficients, may be used in place of the power spectral coefficients. Since these transforms summarize the envelope (overall shape) of the spectrum, the load sum may be calculated using only the low order terms to give the sound quality featuring quantities X.

FIG. 3C shows the sound quality featuring quantities X of the acoustic signals shown in FIG. 3A, calculated using the KL transform. As shown in FIG. 3C, a definite difference is produced in the values of the sound quality featuring quantities X between the first candidate domain belonging to the normal domain and the second candidate domain belonging to the highlight domain.

Returning to FIG. 2, the candidate domain evaluating unit 15 quantifies, as scores, the degree of the climax in the respective candidate domains, based on the short-term amplitudes A(t) supplied from the amplitude calculating unit 11 and the sound quality featuring quantities X supplied from the, feature extraction unit 14. Specifically, referring to the flowchart of FIG. 5, a candidate domain is acquired in a step S10 by the candidate domain extraction unit 13. In the next step S11, a domain length $y_1$ of each candidate domain, the maximum value $Y_2$ of the short-term amplitudes A(t), an average value $y_3$ of the short term amplitude A(t), a length $y_4$ by which the sound quality featuring quantities X exceed a preset threshold, a maximum value $y_5$ of the sound quality featuring quantities X and a mean value $Y_6$ of the sound quality featuring quantities X, are calculated, using the short-term amplitudes A(t) and the sound quality featuring quantities X, to give a feature vector of the candidate domain. Meanwhile, a ratio of the length $y_4$ by which the sound quality featuring quantities X exceed the preset threshold with respect to the length of the candidate domain may be used in place of the length $y_4$ by which the sound quality featuring quantities X exceed a preset threshold.

Figure 5:
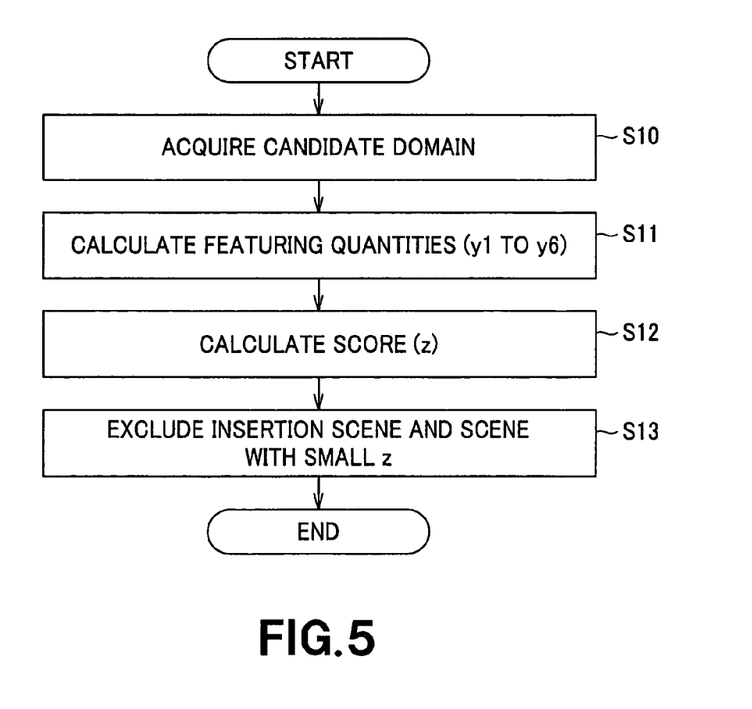
FIG. 5 is a flowchart for illustrating the operation in the candidate domain extracting unit in the acoustic signal processing apparatus.

By calculating the maximum value of the sound quality featuring quantities X within the candidate domain in the candidate domain evaluating unit 15, the featuring quantities of a signal portion where the announcer's speech is momentarily interrupted may be used even in a case where the announcer's speech is superposed during the highlight time and the spectral distribution is distorted. Thus, the present invention may be applied to acoustic signals on which the other extraneous speech is superposed, such as broadcast signals.

In the next step S12, a score value z, indicating the degree of the climax of each candidate domain, is calculated in accordance with the following equation (2):

$$z = \sum_{i=1}^{6} u_i y_i + u_0 \quad (2)$$

where $u_i$ and $u_0$ denote a loading coefficient and a preset bias value, respectively. For determining the loading coefficient $u_i$ and the bias value $u_0$, a variety of statistic discriminating methods may be used. For example, it is possible to subjectively evaluate the degree of the climax of a large number of scenes, and to provide a learning sample consisting of a set of the feature vector and the desirable score value, such as 0.0 to 1.0, to find a load linearly approximated by multiple regression analysis to determine the load coefficient $u_i$ and the bias value $u_0$. The neural network technique, such as perceptron, or the verifying methods, such as Baize discrimination method or the vector quantization, may be used.

Finally, in a step S13, the domain represented by the insertion domain information, supplied from the insertion detecting unit 12, or the candidate domain, or the candidate domain, the score value z of which is not larger than the preset threshold value, among the candidate domains, is excluded from the highlight domain.

The candidate domain evaluating unit 15 sends the start and end positions and the score value of the highlight domain to the index generating unit 16.

The index generating unit 16 generates and outputs indices, each including the start and end positions and the score value of the highlight domain, supplied from the candidate domain evaluating unit 15. It is also possible to set the number of the domains to be extracted and to generate indices in the order of the decreasing score values z until the number of the domains to be extracted is reached. It is likewise possible to set the duration of time for extraction and to generate indices in the order of the decreasing score values z until the duration of time for extraction is reached.

Thus, with the first embodiment of the acoustic signal processing apparatus 10, the domain in which the domain length T with the short term duration A(t) not less than the amplitude threshold value $A_{thsd}$ is not less than the time threshold value $T_{thsd}$ is retained to be the candidate domain, and the score value z indicating the degree of the climax is calculated, using the featuring quantities $y_1$ to $Y_6$ relevant to the amplitude and the sound quality for each candidate domain, to generate the index corresponding to the highlight domain.

A recording and/or reproducing apparatus according to the second embodiment of the present invention exploits the above-described acoustic signal processing apparatus 10. With the recording and/or reproducing apparatus, it is possible to record the start and the ends positions of the highlight domain and so forth at the time of the image recording/sound recording of broadcast signals and to skip-reproduce only the highlight domain or to reproduce the summary picture at the time of reproduction.

Figure 6:
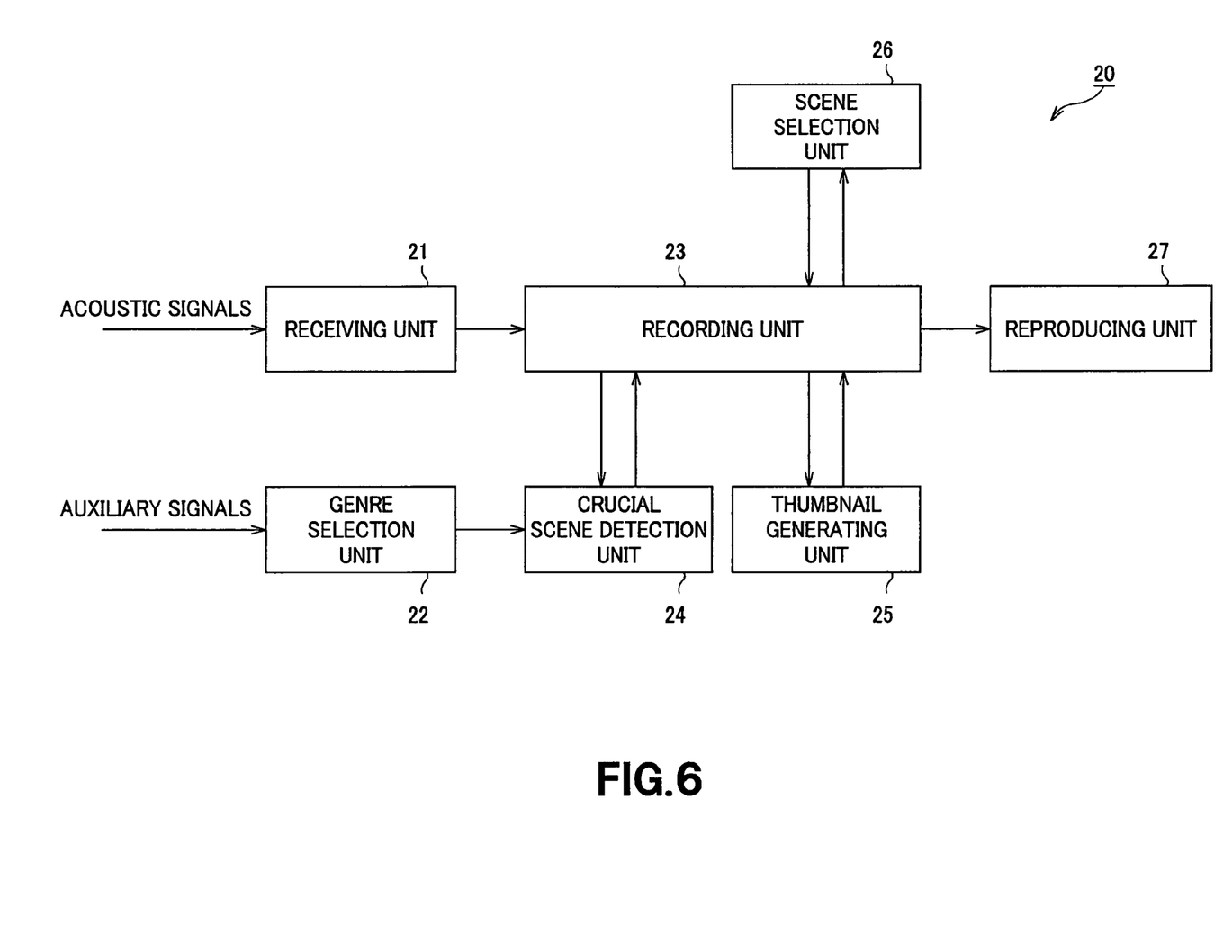
FIG. 6 shows a schematic structure of a recording and/or reproducing apparatus in a second embodiment of the present invention.

FIG. 6 shows a schematic structure of this recording and/or reproducing apparatus. Referring to FIG. 6, a recording and/or reproducing apparatus 20 is made up by a receiving unit 21, a genre selection unit 22, a recording unit 23, a crucial scene detection unit 24, a thumbnail generating unit 25, a scene selection unit 26 and a reproducing unit 27. The crucial scene detection unit 24 corresponds to the aforementioned acoustic signal processing apparatus 10.

Figure 7:
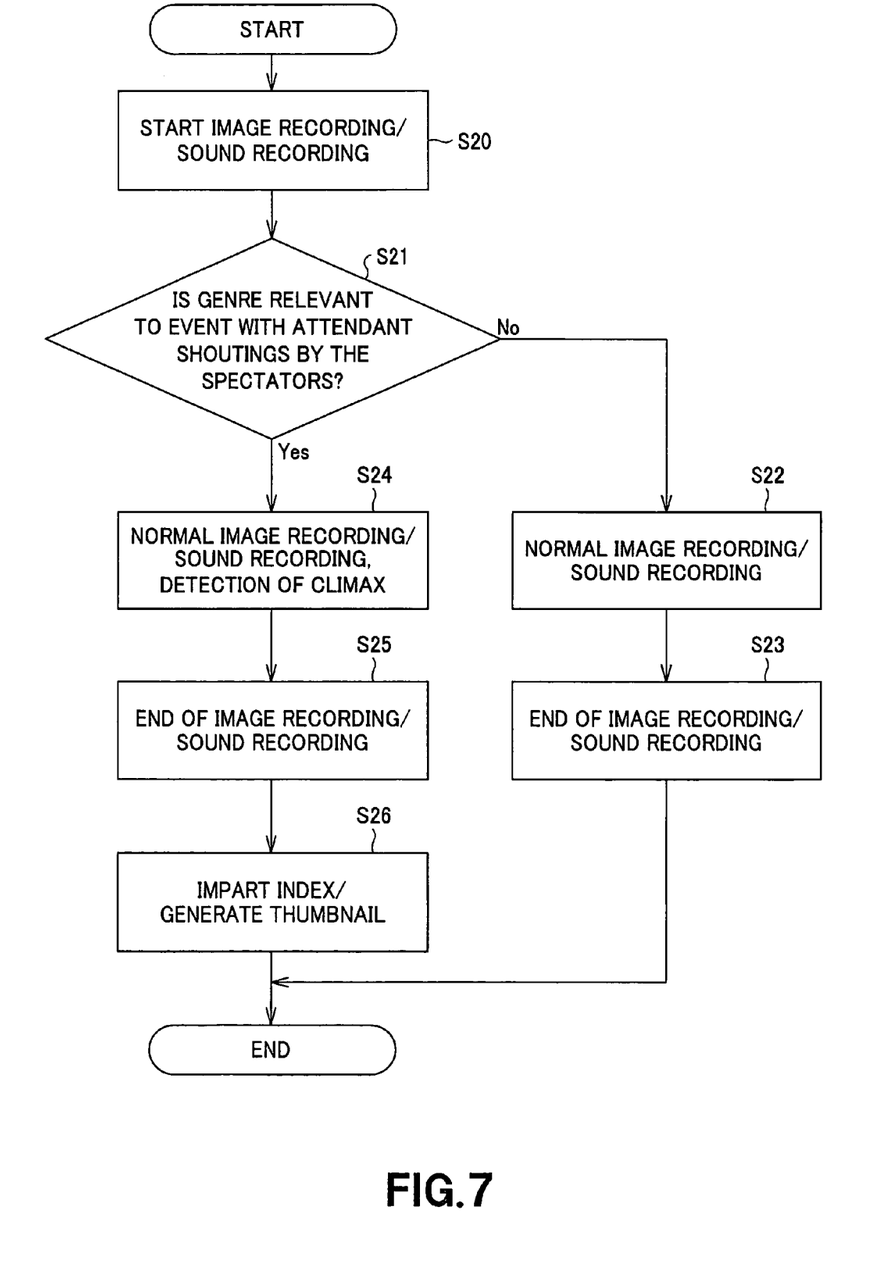
FIG. 7 is a flowchart for illustrating the image recording/sound recording in the recording and/or reproducing apparatus.

The recording operation of the video/acoustic signals in the recording and/or reproducing apparatus 20 is now explained by referring to the flowchart of FIGS. 6 and 7. First, in a step S20, the receiving unit 21 starts the image recording/sound recording operation of receiving and demodulating broadcast signals, under a command from a timer or a user, not shown, and recording the demodulated broadcast signals on the recording unit 23.

In the next step S21, the genre selection unit 22 verifies, with the aid of the information of an electronic program guide (EPG), whether or not the genre of the broadcast signals is relevant to the event with attendant shoutings of the spectators. If it is verified in the step S21 that the genre of the broadcast signals is not relevant to the event with attendant shoutings of the spectators (NO), the processing transfers to a step S22, where the receiving unit 21 terminates the image recording/sound recording, under a command from the timer or the user. If conversely the genre of the broadcast signals is relevant to the event with attendant shoutings of the spectators (YES), the processing transfers to a step S24.

It is noted that, in the step S21, the user may command the genre, in the same way as the EPG information is used. The genre may also be automatically estimated form the broadcast signals. For example, in case the number of the candidate domains and the score values z of the respective candidate domains are not less than the preset threshold values, the genre may be determined to be valid.

In a step S24, the receiving unit 21 executes the usual image recording/sound recording operations for the recording unit 23 at the same time as the crucial scene detection unit 24 detects the start and end positions of the highlight domain as being a crucial scene.

In the next step S25, the receiving unit 21 terminates the image recording/sound recording, under a command from the timer or the user. However, in the next step S26, the crucial scene detection unit 24 records indices, including the start and end positions and the score values z of the highlight domain, while the thumbnail generating unit 25 records a thumbnail image of the highlight domain in the recording unit 23.

In this manner, the recording and/or reproducing apparatus 20 detects the highlight domain, at the time of the image recording/sound recording of the broadcast signals, and records the indices, including the start and end positions and the score values z of the highlight domain, in the recording unit 23. Thus, the recording and/or reproducing apparatus 20 is able not only to display the thumbnail image recorded in the recording unit 23 but also to exploit the index to the highlight domain to execute skip reproduction or summary reproduction, as now explained.

Figure 8:
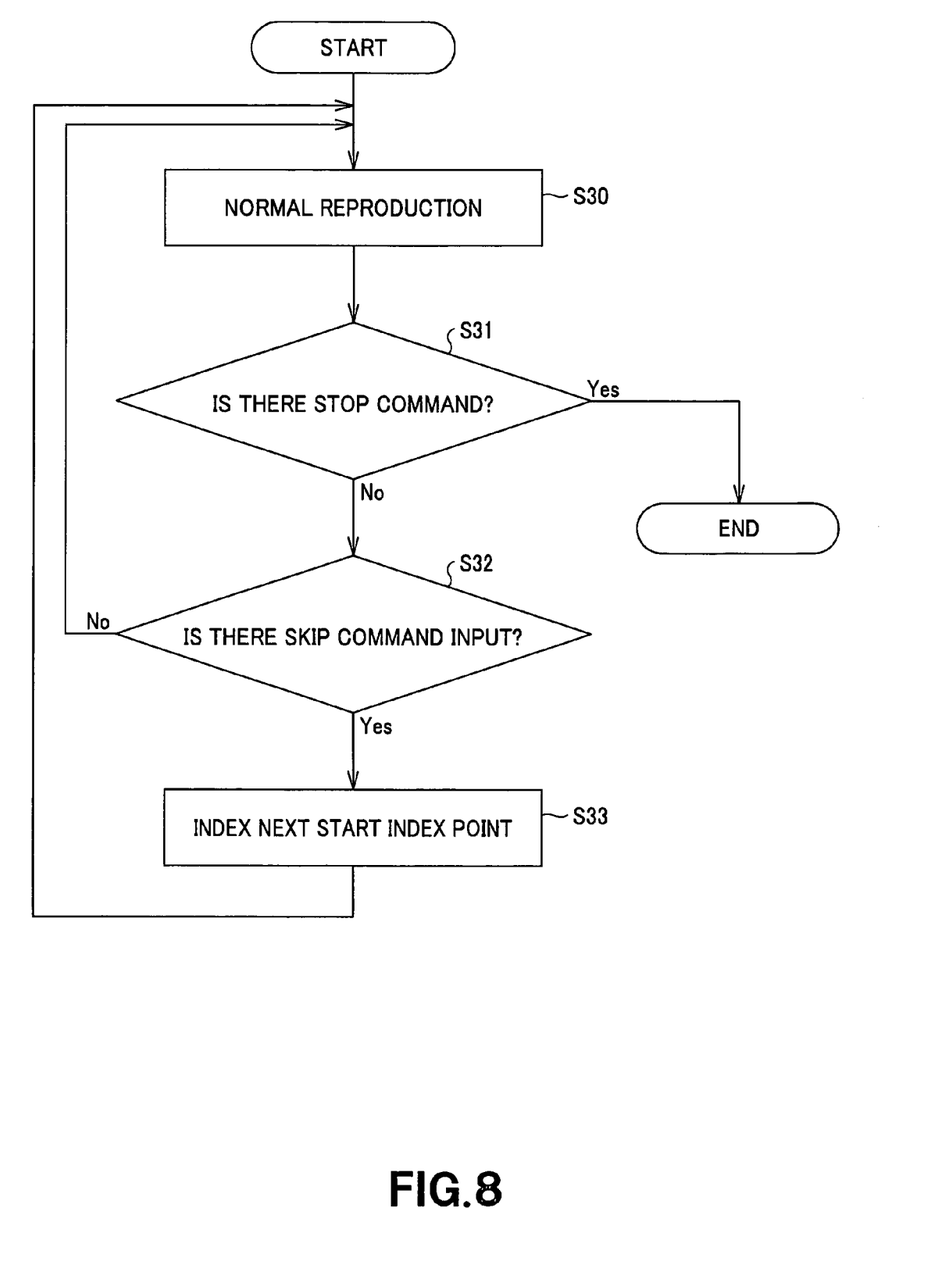
FIG. 8 is a flowchart for illustrating the image recording/sound recording operations in the recording and/or reproducing apparatus.

The skip reproduction in the recording and/or reproducing apparatus 20 is explained by referring to the flowchart of FIGS. 6 and 8. First, in a step S30, the reproducing unit 27 commences the reproduction of the video/acoustic signals, recorded on the recording unit 23, under a command from the user. In a step S31, it is verified whether or not a stop command has been issued from the user. If the stop command has been issued at the step S31 (YES), the reproducing operation is terminated. If otherwise (NO), processing transfers to a step S32.

In the step S32, the reproducing unit 27 verifies whether or not a skip command has been issued from the user. If no skip command has been issued (NO), processing reverts to a step S30 to continue the reproducing operation. If the kip command has been issued (YES), processing transfers to a step S33.

In the step S33, the reproducing unit 27 refers to the index imparted to the highlight domain and indexes to the next indexing point to then revert to the step S30.

Figure 9:
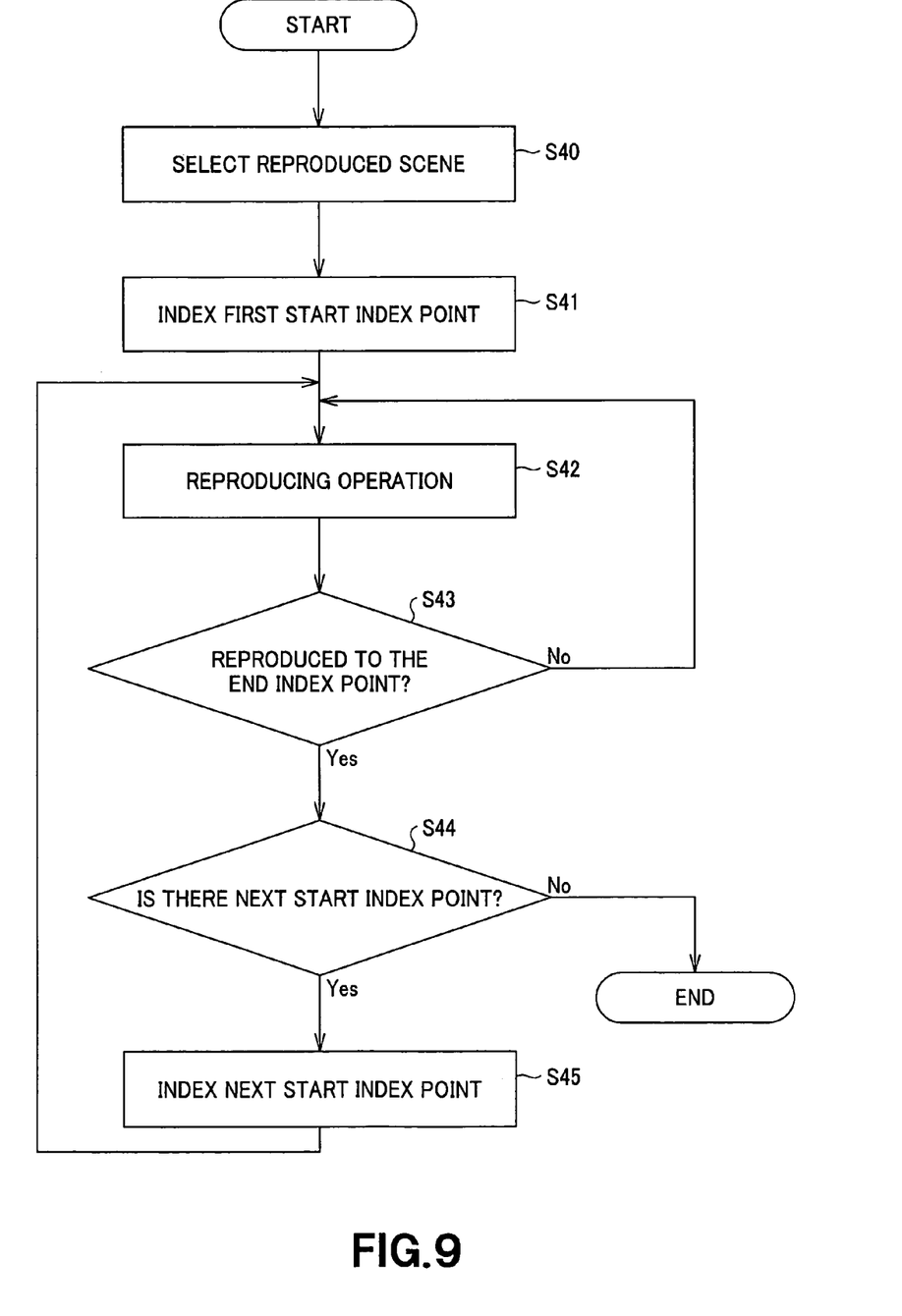
FIG. 9 is a flowchart for illustrating the summary reproducing operation in the recording and/or reproducing apparatus.

The summary reproducing operation in this recording and/or reproducing apparatus 20 is explained, using the flowcharts of FIGS. 6 and 9. First, in a step S40, the scene selection unit 26 selects the scene for reproduction, based on the score value z, in meeting with e.g. the preset time duration, and determines the start and end positions.

In the next step S41, the reproducing unit 27 indexes to the first start index point. In the next step S42, the reproducing unit executes the reproducing operation.

In the next step S43, the reproducing unit 27 checks whether or not reproduction has proceeded to the end index point. If the reproduction has not proceeded to the end index point (NO), processing reverts to the step S42 to continue the reproducing operation. When the reproduction has proceeded to the end index point (YES), the processing transfers to a step S44.

In the step S44, the reproducing unit 27 checks whether or not there is the next start index point. If there is the next start index point (YES), the reproducing unit 27 indexes to the start indexing point to then revert to the step S42. If conversely there is no such next start index point (NO), the reproducing operation is terminated.

With the recording and/or reproducing apparatus 20, according to the present embodiment, the highlight domain is detected at the time of image recording/sound recording of broadcast signals, and the index including the start and end positions and the score value z of the highlight domain, or the thumbnail image of the highlight domain, is recorded in the recording unit 23, whereby the thumbnail image may be displayed depending on the score value z indicating e.g. the crucialness. Moreover, skip reproduction or summary reproduction become possible by exploiting the indices of the highlight domain.

The present invention is not limited to the embodiments described above and various changes may be made within the scope not departing from the scope of the invention.

Foe example, in the explanation of the second embodiment of the present invention, both the image signals and the acoustic signals are assumed to be used. However, this is merely illustrative and similar effects may be arrived at with only acoustic signals.

In the above-described embodiment, the hardware structure is presupposed. This, however, is merely illustrative, such that an optional processing may be implemented by allowing the CPU (central processing unit) to execute a computer program. In this case, the computer program provided may be recorded on a recording medium or transmitted over a transmission medium, such as the Internet.

What is claimed is:

1. An acoustic signal processing apparatus for detecting a featuring portion in acoustic signals, comprising:

amplitude calculating means for calculating short-term amplitudes, at an interval of a preset time length in the acoustic signals;

candidate domain extraction means for extracting candidate domains of said featuring portion based on said short-term amplitudes;

feature extraction means for extracting sound quality featuring quantities, quantifying the sound quality, at an interval of said preset time length in the acoustic signals; and candidate domain evaluating means for evaluating, based on said short-term amplitudes and said sound quality featuring quantities, whether or not said candidate domain is said featuring portion, wherein said sound quality featuring quantities are selected from the group consisting of the short-term power spectrum coefficients of said acoustic signals, short-term cepstrum coefficients of said acoustic signals, and coefficients obtained on Kiarhunen-Loeve transforming said short-term power spectrum coefficients, and wherein said candidate domain evaluating means assigns at least a maximum value of the sound quality featuring quantities to a feature vector and uses the feature vector for candidate domain evaluation.

2. The acoustic signal processing apparatus according to claim 1 wherein said acoustic signals are acoustic signals generated in an event.

3. The acoustic signal processing apparatus according to claim 1 further comprising:

index generating means fore generating the index information including at least a start position and an end position of said featuring portion.

4. The acoustic signal processing apparatus according to claim 1 wherein said feature extraction means extracts a domain as a candidate domain, in case the short-term amplitudes of said domain exceed a first threshold value, and said domain exceeds a second threshold value and persists.

5. The acoustic signal processing apparatus according to claim 1 wherein said candidate domain evaluating means evaluates whether or not said candidate domain is said featuring portion, using at least one of a domain length of said candidate domain, a maximum value or an average value of said short-term amplitudes in said candidate domain, a length by which said sound quality featuring quantities exceed a preset threshold value in said candidate domain or a ratio of said length to the length of said candidate domain, and a maximum value or an average value of said sound quality featuring quantities in said candidate domain.

6. The acoustic signal processing apparatus according to claim 1 further comprising:

insertion detection means for detecting an insertion signal in said acoustic signals;

said candidate domain evaluating means evaluating whether or not said candidate domain is said featuring portion, based on an insertion domain as detected by said insertion detection means.

7. The acoustic signal processing apparatus according to claim 6 wherein when a plurality of small sound volume domains, each having said short-term amplitudes less than a preset threshold, have occurred per a preset time, said insertion detection means detects a domain, sandwiched between neighboring ones of said small sound volume domains, as being said insertion domain.

8. The acoustic signal processing apparatus according to claim 6 wherein said acoustic signals include a commercial message and wherein said insertion detection means detects said commercial message as said insertion signal.

9. An acoustic signal processing method for detecting a featuring portion in acoustic signals, comprising:

an amplitude calculating step of calculating short-term amplitudes, at an interval of a preset time length in the acoustic signals;

a candidate domain extraction step of extracting candidate domains of said featuring portion based on said short-term amplitudes;

a feature extraction step of extracting sound quality featuring quantities, quantifying the sound quality, at an interval of said preset time length in the acoustic signals; and a candidate domain evaluating step of evaluating, based on said short-term amplitudes and said sound quality featuring quantities, whether or not said candidate domain is said featuring portion, wherein said sound quality featuring quantities are selected from the group consisting of the short-term power spectrum coefficients of said acoustic signals, short-term cepstrum coefficients of said acoustic signals, and coefficients obtained on Karhunen-Loeve transforming said short-term power spectrum coefficients, and wherein said candidate domain evaluating step comprises assigning at least a maximum value of the sound quality featuring quantities to a feature vector and using the feature vector for candidate domain evaluation.

10. The acoustic signal processing method according to claim 9 wherein said acoustic signals are acoustic signals generated in an event.

11. The acoustic signal processing method according to claim 9 further comprising:

an index generating step of generating the index information including at least at least a start position and an end position of said featuring portion.

12. A signal recording apparatus comprising:

amplitude calculating means for calculating short-term amplitudes, at an interval of a preset time length in acoustic signals;

candidate domain extraction means for extracting candidate domains of crucial portions of said acoustic signals based on said short-term amplitudes;

feature extraction means for extracting sound quality featuring quantities, quantifying the sound quality, at an interval of said preset time length in the acoustic signals;

candidate domain evaluating means for calculating the cruciainess of said candidate domain based on said short-term amplitudes and said sound quality featuring quantities, and for evaluating, based on said short-term amplitudes and said sound quality featuring quantities, whether or not said candidate domain is said featuring portion;

index generating means for generating the index information including at least a start position and an end position of the candidate domain and the degree of cruciainess of the candidate domain evaluated as being said crucial portion by said candidate domain evaluating means; and recording means for recording said index information along with said acoustic signals, wherein said sound quality featuring quantities are selected from the group consisting of the short-term power spectrum coefficients of said acoustic signals, short-term cepstrum coefficients of said acoustic signals, and coefficients obtained on Karhunen-Loeve transforming said short-term power spectrum coefficients and wherein said candidate domain evaluating means assigns at least a maximum value of the sound quality featuring quantities to a feature vector and uses the feature vector for candidate domain evaluation.

13. The signal recording apparatus according to claim 12 wherein said acoustic signals are acoustic signals generated in an event.

14. The signal recording apparatus according to claim 12 wherein said feature extraction means extracts a domain as a candidate domain, in case the short-term amplitudes of said domain exceed a first threshold value, and said domain exceeds a second threshold value and persists.

15. The signal record apparatus according to claim 12 wherein said candidate domain evaluating means evaluates whether or not said candidate domain is said featuring portion, using at least one of a domain length of said candidate domain, a maximum value or an average value of said short-term amplitudes in said candidate domain, a length by which said sound quality featuring quantities exceeds a preset threshold value in said candidate domain or a ratio of said length to the length of said candidate domain, and a maximum value or an average value of said sound quality featuring quantities in said candidate domain.

16. The signal record apparatus according to claim 12 further comprising:

discriminating means for discriminating whether or not said acoustic signals are of a valid genre.

17. The signal record apparatus according to claim 16 wherein said discriminating means decides that the acoustic signals are of a valid genre when the number of the candidate domains and the degree of crucialness of the candidate domains are not less than preset thresholds.

18. A signal recording method comprising:

an amplitude calculating step of calculating short-term amplitudes, at an interval of a preset time length in acoustic signals;

a candidate domain extraction step of extracting candidate domains of crucial portion of said acoustic signals, based on said short-term amplitudes;

a feature extraction step of extracting sound quality featuring quantities, quantifying the sound quality, at an interval of said preset time length in the acoustic signals;

a candidate domain evaluating step of calculating the crucialness of said candidate domain based on said short-term amplitudes and said sound quality featuring quantities, and for evaluating, based on said short-term amplitudes and said sound quality featuring quantities, whether or not said candidate domain is said featuring portion;

an index generating step of generating the index information including at least a start position and an end position of the candidate domain and the degree of crucialness of the candidate domain evaluated as being said crucial portion by said candidate domain evaluating means; and a recording step of recording said index information along with said acoustic signals, wherein said sound quality featuring quantities are selected from the group consisting of the short-term power spectrum coefficients of said acoustic signals, short-term cepstrum coefficients of said acoustic signals, and coefficients obtained on Kiarhunen-Loeve transforming said short-term power spectrum coefficients, and wherein said candidate domain evaluating step comprises assigning at least a maximum value of the sound quality featuring quantities to a feature vector and using the feature vector for candidate domain evaluation.

19. The signal recording method according to claim 18 wherein said acoustic signals are acoustic signals generated in an event.

* * * * *